(No Model.) 2 Sheets—Sheet 1.

S. T. JENKINS.
CAR.

No. 407,212. Patented July 16, 1889.

Witnesses:
James F. O'Hamel
Horace A. Dodge

Inventor:
Simeon T. Jenkins,
by Dodge & Son,
Atty.

(No Model.) 2 Sheets—Sheet 2.
S. T. JENKINS.
CAR.
No. 407,212. Patented July 16, 1889.
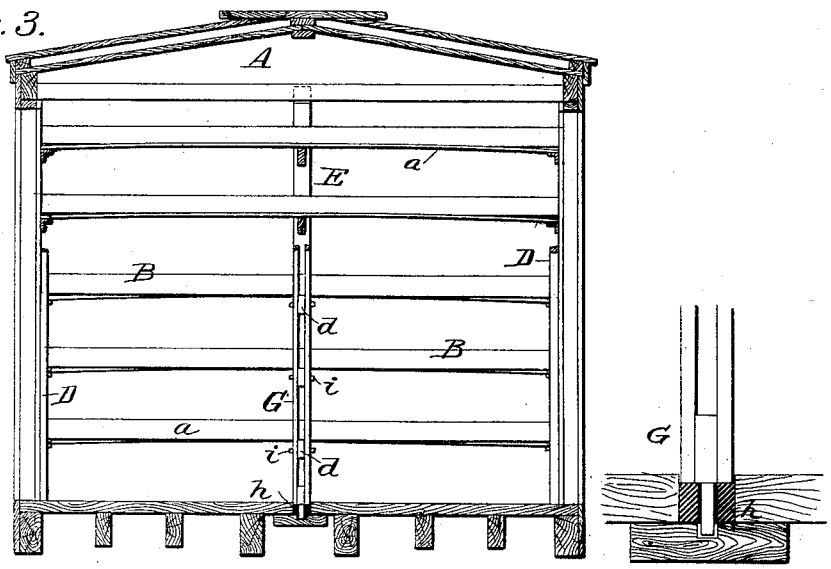
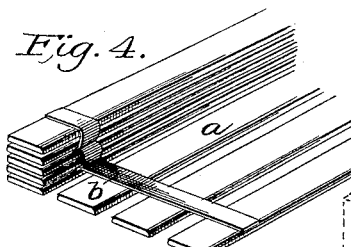
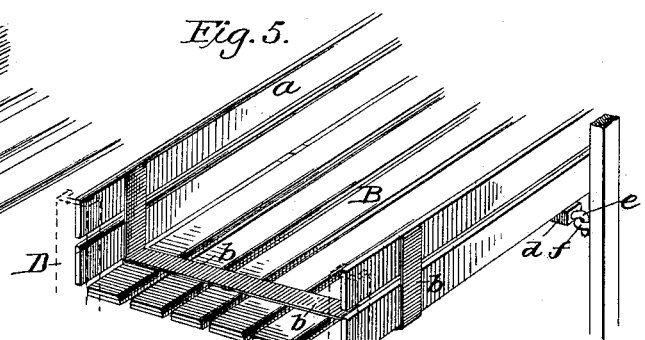
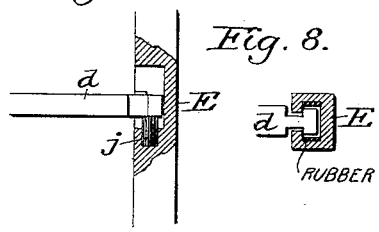 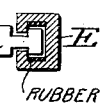
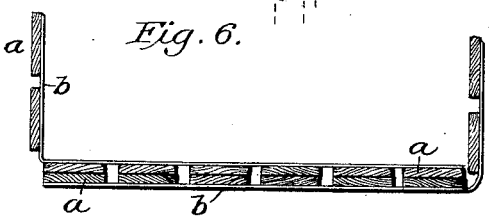
Witnesses:
James F. DuHamel
Horace A. Dodge
Inventor:
Simeon T. Jenkins
by Dodge Sons
Attys.

UNITED STATES PATENT OFFICE.

SIMEON T. JENKINS, OF BALTIMORE, MARYLAND, ASSIGNOR TO JENKINS, McGUIRE & CO., OF SAME PLACE.

CAR.

SPECIFICATION forming part of Letters Patent No. 407,212, dated July 16, 1889.

Application filed October 19, 1888. Serial No. 288,570. (No model.)

*To all whom it may concern:*

Be it known that I, SIMEON T. JENKINS, of Baltimore, in the State of Maryland, have invented certain new and useful Improvements in Cars and other Conveyances, of which the following is a specification.

My invention relates to the transportation of fruit and vegetables in bulk, and has for its object the thorough ventilation thereof, to avoid heating, and the separation and elastic supporting of the fruit, to protect it against crushing or jamming by reason of the jolting or the sudden stopping or starting of the conveyance, or by its own weight.

The invention consists, primarily, in the combination, with a car, vessel, or other conveyance, of a series of ventilated and adjustable trays, either elastic in themselves or elastically supported, both as to vertical and lateral strains, and, if need be, as to longitudinal movement also.

The invention further consists in various features and details of construction whereby the trays are rendered cheap and durable and capable of being folded compactly for storage when not required for use, and whereby also the car may be readily adapted either for the transportation of fruit or of general merchandise.

As above intimated, the invention is applicable to cars, vessels, and other vehicles and conveyances generally; but for convenience of illustration I have shown it as embodied in a railway-car, for which it is peculiarly adapted.

Figure 1:
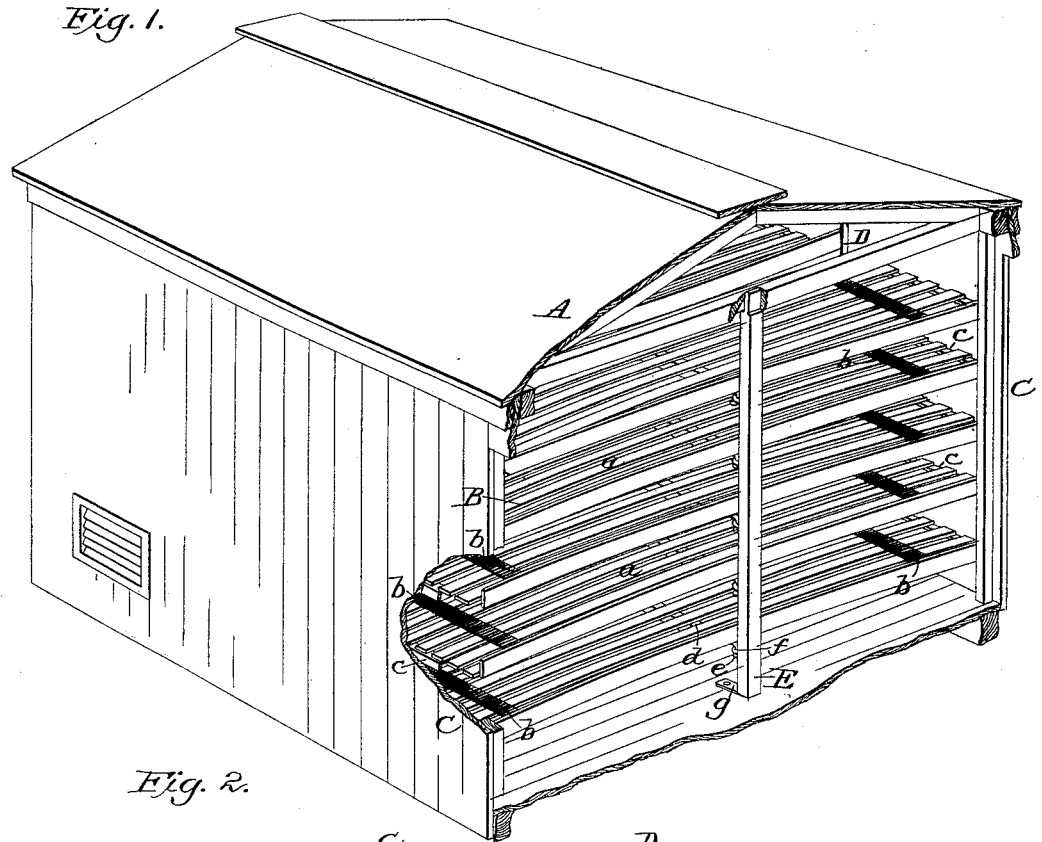
Figure 2:
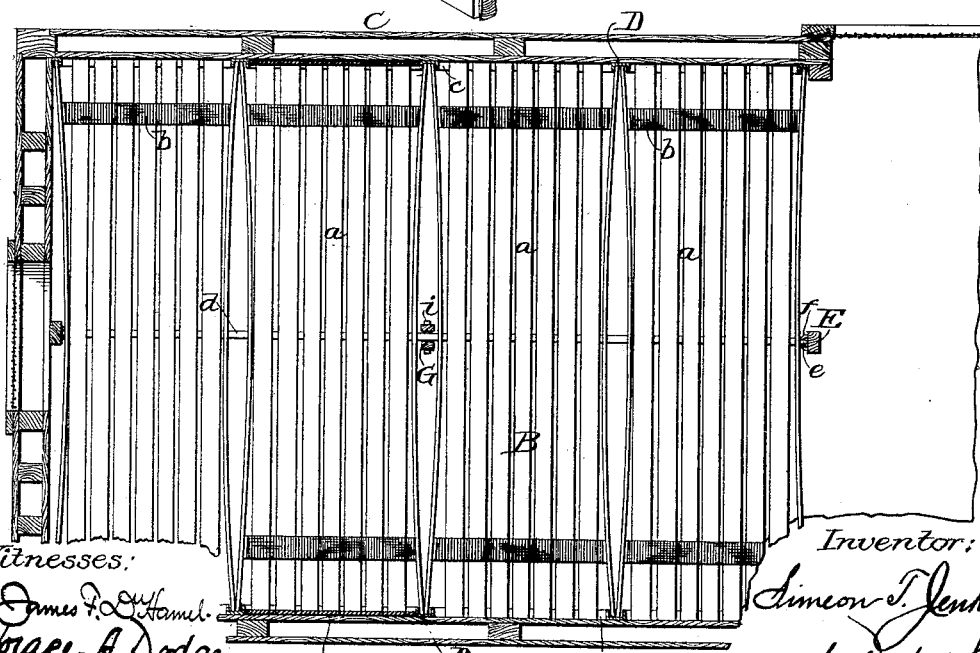

Figure 1 is a perspective view of one end of a railway-car embodying my invention; Fig. 2, a horizontal sectional view of the same; Fig. 3, a transverse vertical section of the car at its mid-length; Figs. 4 to 8, views illustrating details of construction.

In the transportation of fruit and vegetables in bulk it is found that great loss occurs through heating and through the crushing or mashing of the fruit, due to the weight of the upper layers or tiers and their pressure upon the lower ones, and further to the concussion incident to the jolting and sudden motions of the conveyance. Even melons, while not showing externally any signs of injury, are frequently found to be badly heated and crushed internally, and thereby greatly impaired, for which reason it is found unprofitable to ship them in the common way, piled upon one another to a considerable height, while, on the other hand, valuable space is wasted if they be piled to only two or three layers; hence the tendency has been to grow thick-rinded good-shipping melons instead of ripe finely-flavored fruit. With smaller fruits, as peaches, pears, and the like, it is customary to pick them while quite green, in order that they may not be crushed in transportation, and as a consequence the fruit comes to the market green or wilted, or both. By separating the fruit into layers of slight depth set apart one from another, so that air may freely circulate about them, these various difficulties may be effectually surmounted, and to do this cheaply and efficiently is the design of the present invention.

Referring again to the drawings, A indicates the body of a railway-car, or it may be any other suitable conveyance, and B a tray, of which there may be any desired or convenient number.

The construction of the tray is peculiar, and is well represented in Figs. 1 to 5, wherein it will be seen to consist of a series of thin slats of wood $a$, connected by strong bands of webbing $b$, or equivalent strong and flexible material, the edges next the fruit being rounded to prevent cutting the same. Metal slats and leather straps or metal hinges may be substituted for the wood and webbing, but not to so good advantage. The slats $a$ are thin enough to be quite elastic, yet heavy and wide enough to properly sustain any load likely to be placed upon them, which they are the better enabled to do by reason of their being arched or bowed upward at the middle when in position, as will be explained farther on.

The walls C of the car, vessel, or other conveyance are furnished with horizontal supporting strips or ledges $c$, to support the ends of the trays, and horizontal bars or timbers $d$ are carried beneath the trays at their midlength through an upright brace or standard G, which rests on a spring $h$, of rubber or other material, and is held in place by a bolt $i$, passing through one or more of the bars $d$.

The ends of the horizontal bars *d* advisably rest on rubber or other springs *j* in a socket in post E, and said ends are provided with T-heads, to enter similarly-shaped sockets, as shown in Figs. 7 and 8, so that the bars *d* will not pull or jostle out; or the ends of bars *d* may be furnished with hooks *e*, to enter eyes or staples *f* in posts E, as indicated in Figs. 1, 2, and 5.

At suitable points the walls C are furnished with vertical guides D, to receive the ends of slats *a* of the trays, which are turned up to a vertical position to form side walls for the trays, as shown in Figs. 1 and 2, said guides consisting, preferably, of strips of heavy sheet metal bent into U form and screwed, nailed, or bolted to the walls, with the edges outward, so that the ends of the slats *a*, forming the sides of the trays, may enter the grooves or channels thus formed.

The guides D, which are located between two trays, are made wide enough to receive the ends of two slats side by side, as shown in Fig. 2. The bottom slats *a* are made slightly longer than the distance between the walls of the car or conveyance, so that they may complete the arch or upward bow referred to and have their ends sustained by ledges *c*; so, also, are the slats that turn up and form the sides of the tray longer than said distance, in order that they may complete the arch or lateral bow and be sustained in position by the guides D. As a consequence of such bowing or arching of the slats, they are quite stiff, though thin enough to be very elastic and to yield readily to any sudden or excessive strain or pressure. The bottom slats thus effectually take up the shock due to running over rough roads, which shock will be mainly or largely transmitted vertically, and the side slats spring against each other and take up the shock, and prevent the concussion that would otherwise be incident to sudden stopping and starting of the conveyance.

In order that the available space within the conveyance may be fully utilized, I find it advantageous to provide strips or ledges *c* at intervals of about five to eight inches, so that trays may be placed as close together as is consistent with free circulation of air between them when containing two or three layers of oranges, peaches, or similar small fruits. The distance apart of these ledges or strips and other matters of proportion will, however, be varied as circumstances require.

When larger vegetables or fruits are to be carried—such as cabbage or melons—requiring greater space and stronger support, two trays are combined to form one, in the manner illustrated in Figs. 5 and 6, two or more slats of one tray being turned up to form one side of the combined tray and a corresponding number of the other single tray being turned upward to form the other side, while the remaining slats of the two single trays fall below and above one another, and thus give double strength to the bottom of the combined trays or double tray.

It is desirable that the car or other conveyance be readily convertible from one to another arrangement of interior, so that it may be used at will for the shipment of fruit or of general merchandise, and to this end the posts E are made removable. The upper end of each post E may enter a mortise in one of the roof-timbers of the conveyance, and the lower end may enter a socket in the floor, or, as is preferred, it may be furnished with a metal angle-plate *g*, which latter will be made fast to the post and to the floor by screws or other fastenings admitting of ready removal and replacement. The precise manner of securing the posts in position is not important and may be varied at will.

In practice it is preferred to leave the central part of the car open and unobstructed by trays, so that if desired other merchandise may be carried in the same car with fruit, and so also that cell-cases containing the finest grade of fruit may be carried in the same conveyance with the less expensive fruit of the trays.

Should the first layer of fruits or vegetables be placed on the floor of the car or other conveyance, instead of using trays, a board may be extended across from one door-post to another, or a tray may be partly folded and placed edgewise across to hold it in position.

When not required for use, the trays may be compactly folded and tied and placed in one end or in the top of the car, leaving it unobstructed and ready for general use.

The guides D may be of wood, rabbeted or grooved, or two separate strips placed side by side with sufficient space for the slats *a* between them may be used. Whether made of metal or wood, the guides may be made elastic by springs, or by inserting rubber buffers, half filling the groove, to aid the slats in taking up shock and jar.

While I much prefer the slatted trays, measurably good results may be attained through the use of canvas trays or the like, such material being sufficiently elastic in itself.

I am aware that freight-cars have been provided with spring-supported bottoms movable independently of the side and end walls, and that spring-frames or "mattresses" have been devised for use in such cars to prevent injury to the load by jolting while in transit, and to permit a circulation of air between the packages or parcels constituting the cargo. I am also aware that slatted shelves or trays adjustable as to height have been employed in cars to separate into layers small articles or packages, which cannot be carried in bulk because the under layers cannot support the weight of those above. Finally, I am aware that sleeping-cars have been provided with rolling and folding berths made of woven fabric or of slats connected by flexible bands and adapted to be rolled into chambers or recesses formed in the car to receive them. I do not therefore broadly claim such features of construction; but so far as I aware no one has heretofore constructed or proposed a folding tray composed of elastic slats connected by flexible bands and wholly disconnected or detachable from the car, or from the supports upon which it rests within the car, such construction and arrangement enabling me to entirely remove the trays from the interior of the car, or to place them in any desired part of the car when not required for use. In freight and express cars, for which these trays are designed, it would be impracticable, both for want of room and because of the expense, to provide the chambers to receive the trays, and the permanent attachment or connection of the trays to the car-body or to some fixed part of the car would preclude their ready adjustment to different levels and positions, which adjustment is essential to the proper utilization of the space and adaptation of the car to different classes of cargoes.

The idea of arching or bowing the elastic slats or of placing them between end supports at such distance apart as shall insure the formation of a bow or arch I believe to be new, and such construction and arrangement are found in practice to be extremely efficient and satisfactory.

Having thus described my invention, what I claim is—

1. In combination with a car or other conveyance, a detachable and removable tray formed of elastic slats with intervening open spaces, and thereby adapted to support fruit, &c., to permit the passage of air between the slats and to take up the jar and concussion incident to the motion of the vehicle.

2. In combination with a car or other vehicle provided with suitable supports, a folding tray or trays consisting of a series of slats connected one with another, but having intervening open spaces for the passage of air, said trays resting upon but being readily removable from their supports.

3. In combination with a car or other conveyance having horizontal ledges or supports on its walls, a tray or trays composed of slats slightly longer than the space between the end supports of the tray, whereby said slats are caused to assume a curved or arched form when placed in position.

4. In combination with a car or other conveyance having horizontal strips or ledges $c$ and vertical guides D, trays B, having slats $a$, longer than the space over which the trays extend, substantially as and for the purpose set forth.

5. In combination with a car or other conveyance provided with ledges $c$ and guides D, trays B, having the ends of their slats supported by said ledges and guides, and horizontal bars $d$, extending beneath the trays at their middle.

6. In combination with a car or like conveyance having horizontal supporting-ledges $c$ and vertical guides D, trays B carried thereby, horizontal bars or timbers $d$, provided with hooks $e$, removable post E, and eyes or staples $f$, carried by said post and by the wall of the conveyance to receive the hooks $e$.

7. In combination with a car or like conveyance provided with supporting-ledges $c$, trays B, resting at their ends upon said ledges, bars $d$, extending beneath the trays at a point between the ends thereof, supporting-posts for said bars $d$, and springs or elastic supports for said posts.

8. In combination with the trays B and end supports therefor, intermediate supporting-bars $d$, provided with T-heads, and supports E, having sockets of like form provided with spring-supports $j$, substantially as described and shown.

In witness whereof I hereunto set my hand in the presence of two witnesses.

SIMEON T. JENKINS.

Witnesses:
 WALTER S. DODGE,
 HORACE A. DODGE.